March 26, 1929.　　　　J. ZAGORSKI　　　　1,706,833
CLAMPING DEVICE FOR ATTACHING CONDUCTORS
TO SUPPORTING AND TENSIONING MEMBERS
Filed May 25, 1927　　　　6 Sheets-Sheet 1

Inventor
Johann Zagorski,
By Byrnes Townsend Brickenstein,
Attorneys

Patented Mar. 26, 1929.

1,706,833

UNITED STATES PATENT OFFICE.

JOHANN ZAGORSKI, OF FRANKFORT-ON-THE-MAIN, GERMANY, ASSIGNOR TO AMERICAN LURGI CORPORATION, OF NEW YORK, N. Y., A CORPORATION OF NEW YORK.

CLAMPING DEVICE FOR ATTACHING CONDUCTORS TO SUPPORTING AND TENSIONING MEMBERS.

Application filed May 25, 1927, Serial No. 194,168, and in Germany March 24, 1926.

The method hitherto employed for attaching hollow conductors to supporting and tensioning members has been to cut off the hollow conductor at the clamping point, a cone being inserted into the open end of the conductor and driven in so as to clamp the inidvidual wires between the cone and a sleeve surrounding the end of the conductor. The defect of this method of attachment consists in that it separates the wires of the hollow conductor, and that there is no certainty of all the wires being clamped in a uniform manner. Moreover, owing to the conical spread of the hollow conductor, the clamping members assumed considerable dimensions. These defects are removed by the invention.

The clamping device according to the invention consists substantially of a sleeve, provided with a plurality of slits, and pressed by wedge action firmly against the surface or the inner surface of the hollow conductor. The effect of the slits, which preferably proceed from both ends of the sleeve, is to enable the latter to bear against the hollow conductor with equal force all over, so that the pressure set up by the wedge action is distributed uniformly all over the clamped portion of the conductor, and that individual wires or ribbons of the hollow conductor cannot escape at the junction. Moreover, the hollow conductor retains its closed form. The clamping sleeve according to the invention is applied to the outer surface of the hollow conductor in cases where this remains intact, that is to say, is not cut off, at the point of attachment. If, on the other hand, it is cut off for any reason, the clamping sleeve may be of such dimensions that it can be inserted into the end of the hollow conductor which is to be clamped.

In the former case the clamping sleeve is made in two parts, and tapers conically in the direction of the tension of the conductor. It is inserted, with a certain amount of preliminary compression, into a suitably fitting tapered clamping head. The pull exerted by the conductor draws the sleeve continuously more firmly into the clamping head, the pressure on the conductor becomes progressively heavier and the union progressively tighter. To enable it to be applied over the hollow conductor, the clamping head is made in two or more parts, like the sleeve. After being placed round the conductor, the two parts of the head are connected together, for example, by tongue and groove, or by screws, and the clamping is effected in the manner described.

In the second case, in which the hollow conductor is cut off at the point of attachment and the clamping sleeve is inserted into its interior, the sleeve is of cylindrical shape on the outside, and conical—also in the direction of the pull—on the inside, and is pressed against the inner surface of the hollow conductor by means of an inserted cone. In order to enable it to take up the pressure without suffering injury, the conductor end which is to be clamped is inserted into a clamping head of corresponding dimensions. In this case, the clamping head is a cylindrical hollow body, the inside diameter of which is the same as the outside diameter of the hollow conductor. The effect of this embodiment of the invention is the same as in the former case.

In both cases the clamping devices are rigidly or movably connected to a casing in any suitable way, which casing carries the devices for securing the whole fitting to the insulation chains, and, when necessary, for connecting the conductor to the conductor of the next section. The casing is preferably also provided with suitable supports for the conductor.

The clamping sleeve according to the invention may, of course, also be used in the case of carrier clamps. Since the hollow conductor passes through these clamps without suffering interruption, and the pull is therefore exerted on both sides of the point of attachment, two clamping sleeves are naturally used, and are made in two parts so that they can be applied round the hollow conductor. These sleeves are arranged to taper in opposite directions, and may partially interlock by means of suitable recesses. The (divided) clamping head is tapered outwards from the centre in both directions. In this case also, the clamping sleeves are inserted with a corresponding pre-compression into the head, so that the pull exerted by the conductor from both sides forces the sleeves more firmly onto the head all the time. To connect the clamping device with the insulating chains, a special casing is employed to which the clamping device is attached.

The carrier clamp can also be so designed that the two parts of the clamping head are connected together, for example by pin screws which break under a certain unilateral pull on the part of the conductor, thus releasing the conductor and allowing it to slip through the casing of the carrier. This arrangement also affords security against breakage of the mast or conductor.

In addition to the thoroughly reliable attachment of the hollow conductor at the clamping point, the clamping device according to the invention, being of small dimensions, also enables the tensioning and carrier casings to be well designed; rounded off in all directions. It is no longer necessary to have projecting screws and edges on the outer surfaces of the casing; and consequently electrical losses through radiation at these points can be prevented to a large extent. Moreover, in the case of continuous conductors, the clamping device can be arranged so low down in the tensioning casing as to come below the axis of the stretched conductor. With this arrangement, the tensioning clamp is in a highly stable condition of equilibrium.

The invention will now be described with reference to the drawings.

Figs. 1 to 6 represent a clamping device, according to the invention, which grips round the hollow conductor.

Figs. 7–14 represent the arrangement of the clamping device according to the invention in different tension casings. Fig. 12 is a particularly smooth and simple form of the tension casing, and the arrangement of the clamping device therein, as an elevation. Fig. 13 is a section along the line C D E, and Fig. 14 a section along F—G, of Fig. 12.

Figs. 15 and 16 represent a clamping sleeve according to the invention, inserted into the interior of the conductor, Fig. 15 being a longitudinal section through a tension clamp fitted with this clamping sleeve.

Figs. 21–24 show the carrier clamp itself.

Figure 1:
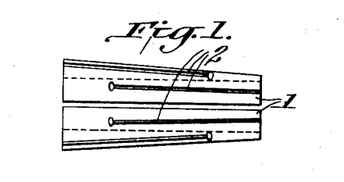
Fig. 1 shows the slit clamping sleeve, as a front elevation.
Figure 2:
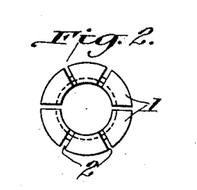
Fig. 2 is a side elevation of the broader end of same.
Figure 3:
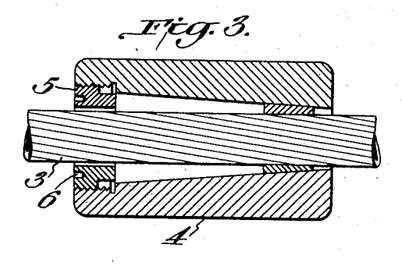
Fig. 3 is a section through the clamping sleeve and clamping head, drawn through two opposite slits in the sleeve.
Figure 4:
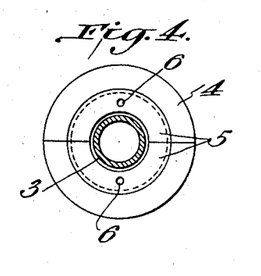
Fig. 4 is a side elevation from the left of Fig. 3.
Figures 5, 6:
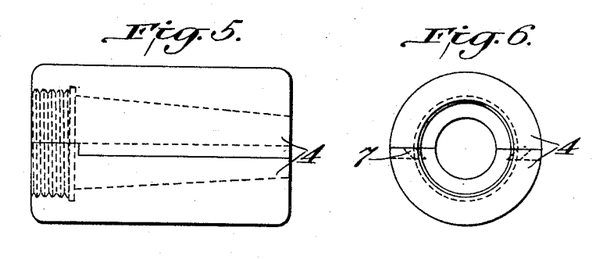
Figs. 5 and 6 are front and side elevations of the clamping head.

In the drawings, 1 denotes the conical clamping sleeve with the oppositely directed slits 2. The sleeve is in two parts, so that it can be applied over the conductor 3. The clamping head 4, which is in two parts for the same reason, is first placed on the conductor, for which purpose the adjacent surfaces of the two parts of said head are provided with dovetail projections and recesses 7. The tension head, the bore of which is tapered in accordance with the external shape of the clamping sleeve, is then pushed over the sleeve. Its broader end is provided with an internal thread, so that the clamping sleeve 1 can be forced into the clamping head by means of the externally threaded nut 5. The wedging action presses the sleeve tightly against the conductor. The slits 2 in the sleeve enable the wedging action to be transmitted to the surface of the conductor in an extremely uniform manner, so that the conductor can be clamped very tightly and uniformly by means of a comparatively light and small clamping device. The clamping device is disposed on the conductor in such a manner that the pull of the conductor is exerted in the direction of the arrow in Fig. 3. When the clamping device is inserted in the casing of the tension clamp, and the latter is attached to the supporting mast, the pull of the conductor on the clamp consequently acts in such a manner as to progressively increase the pressure on the conductor and attach it more firmly to the clamping members. The holes 6 in the nut 5, which is also in two parts, are for the insertion of the key spanner. In order to prevent the conductor from slipping in any circumstances, the cylindrical inner surface of the sleeve 1 may be roughened.

Figures 7, 9:
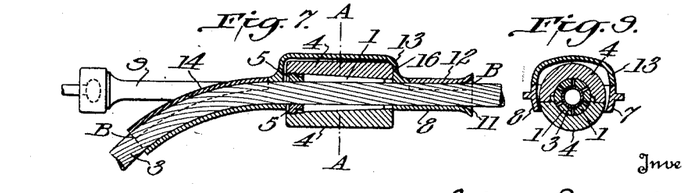
Fig. 7 shows a tension clamp for double-chain tensioning, in longitudinal section, and Fig. 8 the same in plan.
Fig. 9 is a section along A—A of Fig. 7.
Figure 8:
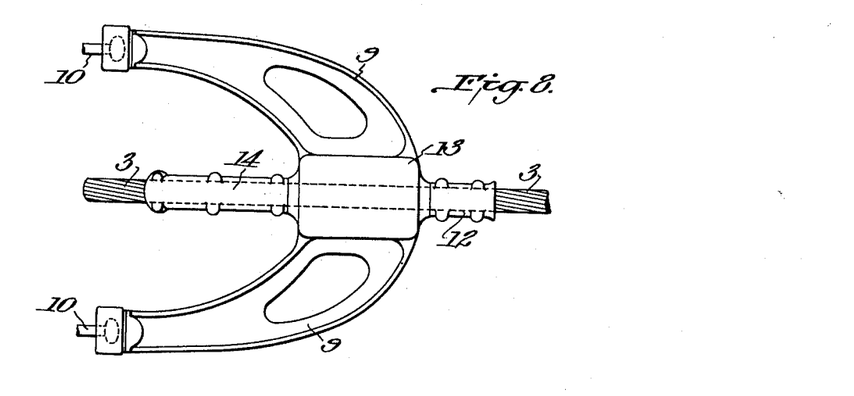

The casing of the tension clamp, into which the clamping device is inserted after being firmly attached to the conductor, may be of any convenient shape. In Figs. 7–9 it consists of a principal member 8, the frame-like part of which houses the clamping device and transmits the strain resulting from the pull of the conductor, to the tension chains 10 through the integrally mounted arms 9. The casing of the tension clamp is prolonged on both sides in conformity with the sag of the conductor. The sectional dimensions of the extensions of the casing are the same as those of the hollow conductor, in order that the latter may find a firm seating therein and connot suffer deformation. On the side at which the pull of the conductor is exerted, the extension of the casing is enlarged vertically, to allow the conductor a certain play under changes in the sag, and thereby protect it from damage. On the side of the unstrained section between the tension clamps, the extension of the casing is curved in accordance with the sagging tendency of the conductor. The clamping head in this form is inserted in the casing in such a manner that the pull of the conductor presses it against a corresponding surface 16 on the carrier, so that it can follow any tendency of the conductor to turn. The same giving way to turning movement can of course be attained by means of other similar arrangements of the clamping head in the casing.

In order that the casing may be rounded on all sides, without projecting edges, it is closed, after the insertion of the clamping head and conductor, by covers 12, 13, 14, which are shown in three parts in the drawing, the divisions being indicated by the broken lines B—B in Fig. 7. The lower part of the casing may be left open, which facilitates assembling, or may also be closed in if desired.

Figure 10:
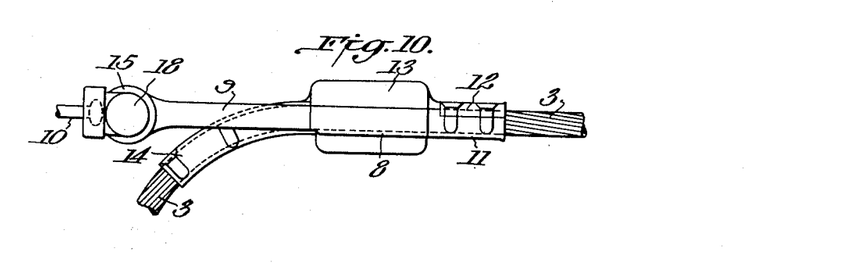
Fig. 10 is a front elevation, and Fig. 11 a plan of a slightly modified form of the casing of the tension clamp.
Figure 11:
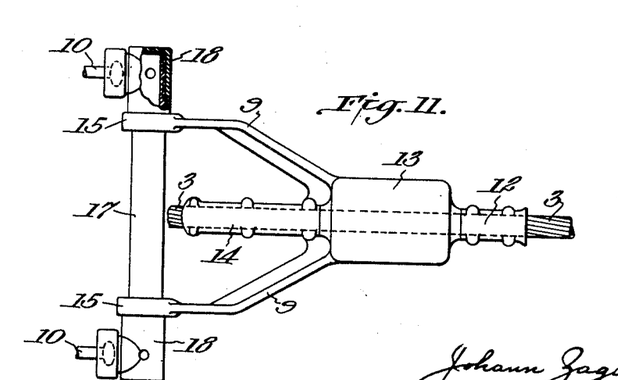

Another embodiment of the new tension clamp, with regard to the transmission of the tension stresses to the tension chains, is shown in Figs. 10 and 11. A galvanized steel tube 17 is passed through the eyes 15 of the two arms 9 of the frame 8. Caps 18, in which the tension chains 10 can be suspended in a suitable manner, are attached to the end of said tube by screws or the like.

Figures 12, 13, 14, 15:
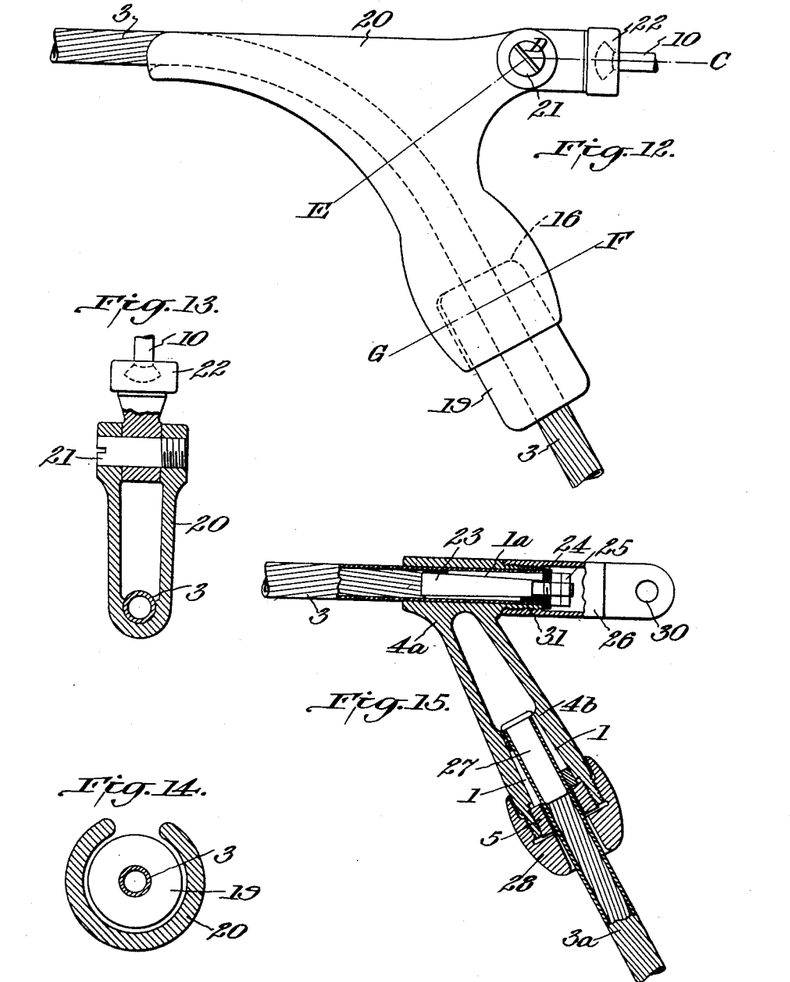

The casing of the tension clamp can, however, be of substantially simpler design. For example, with single-chain tensioning, it is preferable to arrange the clamping device below the axis of the stretched conductor in the casing of the tension clamp, instead of the direction of pull of the conductor. In this way the centre of gravity of the tension clamp is transferred to considerably below the axis of the stretched section of the conductor, and a highly stable equilibrium of the tension clamp is obtained. In this form of the tension clamp, which is shown in Figs. 12–14, the clamping device 19 (which of course is represented diagrammatically in the drawing) is exactly the same as that already described. It is attached to the conductor in the described manner at a point corresponding to a desired degree of sag. The casing 20 of the tension clamp (which is of the form shown in Fig. 12) is slipped over the conductor, until the end of the clamping device bears against a corresponding surface 16 provided in the casing. By means of the bolt 21 and (for example) a swivel cup 22, the casing is attached to the insulating chain 10. The casing 20 extends more than half way round the clamping device 19 and over about half the length of the latter, so that good security is afforded against the clamping device springing out of the tension clamp under the influence of any fluctuations or shocks which may occur in the conductor. In comparison with the previously described form, this casing of the tension clamp also presents the advantage of ease in assembling, the time-wasting taking up of the pull of the conductor being avoided. After the clamping device 19 and casing 20 have been placed on the stretched conductor, a further pull is exerted on the latter until the casing 20 and insulating chain 10 can be connected together by means of the bolt 21. When the conductor is afterwards eased, the clamp automatically assumes the right position, under the pull of the conductor. The design of the casing, without covers and screws, also considerably facilitates assembling. The losses by electrical radiation are also greatly reduced by the completely rounded form of the casing. The casing 20 of the tension clamp can also, of course, be modified so as to be applicable to double catenary suspension.

Figures 16, 17, 18:
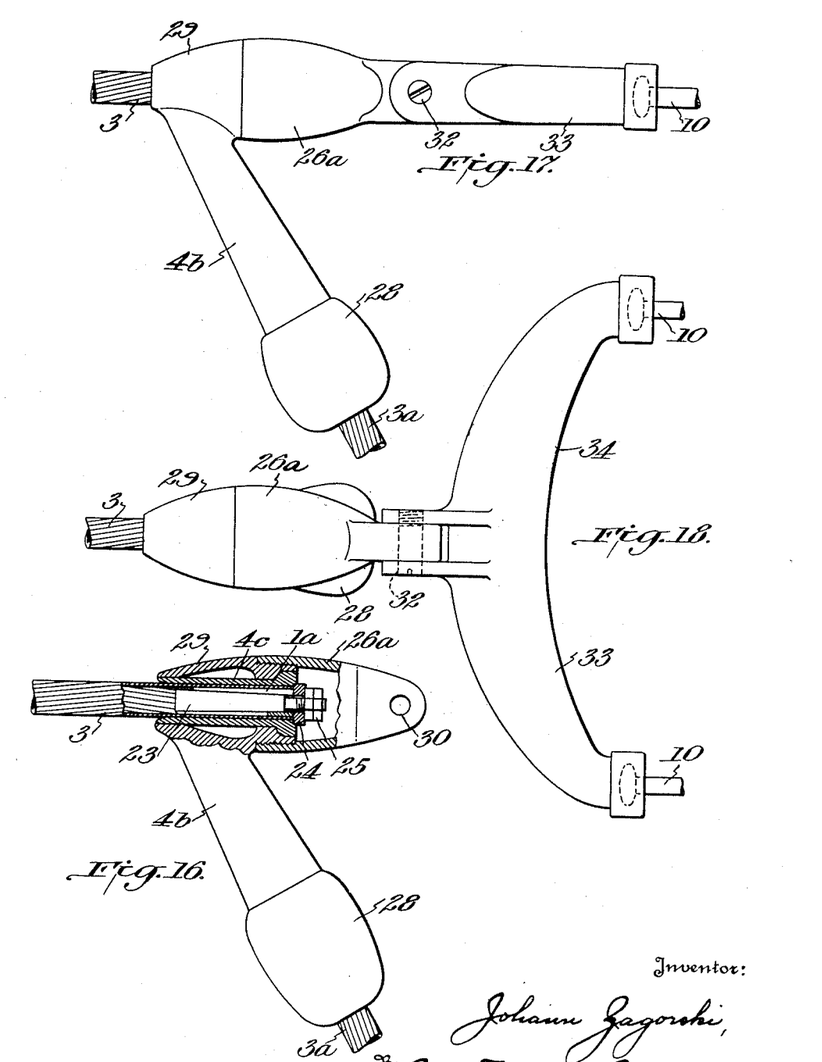
Fig. 16 shows a slightly modified form, also in longitudinal section.
Figs. 17 and 18 show a casing of a similar tension clamp with double chain suspension, as a front elevation and plan, respectively.
Figure 19:
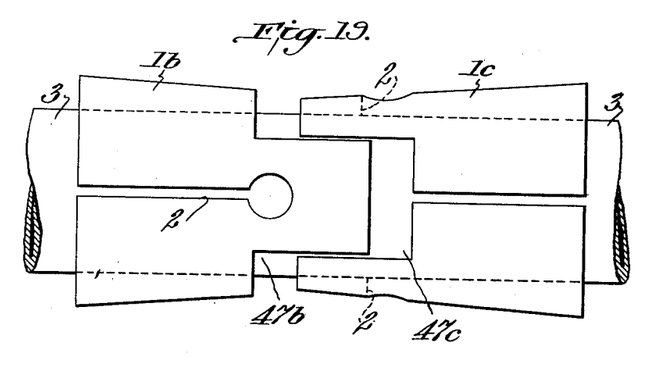
Figs. 19 and 20 show the arrangement of the sleeves according to the invention, applied to the hollow conductor in the case of carrier clamps, Fig. 19 being a front elevation and Fig. 20 a side elevation.
Figure 20:
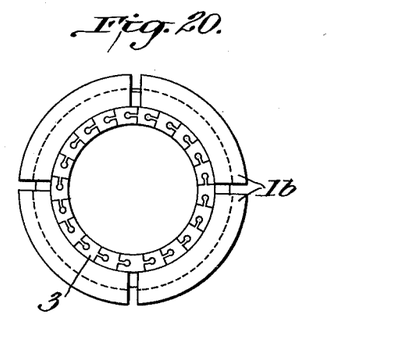

If, in the case of conductors which are cut off at the point of attachment, the clamping sleeve be inserted inside the hollow conductor, the casing of the tension clamp can also be further simplified (Figs. 15–18). In such case, the tension head preferably consists of a part 4$^a$ which, lying in the axial direction of the stretched conductor 3, surrounds the end of the latter as closely as possible. The second part 4$^b$ of the head joins the part 4$^a$ at a suitable angle, and receives, in a similar way, the end of the loose section 3$^a$ of the conductor. This establishes the connection with the corresponding conductor of the next tension section, and therefore leads to the tension clamp arranged in the opposite direction on the same tension mast. The parts 4$^a$ and 4$^b$ may be in one piece, as shown in Figs. 15 and 16, or they may be connected together in any suitable way.

In order to clamp the conductor 3, the part 4$^a$ of the clamping head is slipped over the end of same, and the clamping sleeve 1$^a$ with the internally disposed cone 23, is inserted in said end. The sleeve 1$^a$—which, of course, is also provided with oppositely directed slits—bears with its thicker end against a flange on the nut 24. Tightening up this nut wedges the sleeve 1ª and cone 23 firmly together, and the end of the conductor 3 is clamped to a corresponding extent between the sleeve 1ª and the part 4ª of the tension head. The outer surface of the sleeve 1ª and the inner surface of the part 4ª are roughened, thus producing considerable friction between the outer and inner surfaces of the conductor, on the one hand against the inner surface of the clamping head and the outer surface of the sleeve on the other. The flange on the nut 24 sets up at the same time a positive connection between the part 4ª of the clamping head and the cone 23 in the direction of the pull. A member 26, screwed on to the threaded end 31 of the part 4ª, and provided with an eye 30, facilitates attachment to the insulating chain in the usual manner.

The loose connecting section 3ª of the conductor can either be clamped in the same way, or the previously described embodiment of the clamping device according to the invention may be used, for example (Figs. 15 and 16) by first inserting a cylindrical plug 27 into the end 3ª of the conductor, and gripping the end of the conductor with the sleeve 1, which may also be roughened on its inner surface. The smooth, conical outer surface of the sleeve guides itself in the corresponding bore of the part 4ᵇ of the clamping head. By tightening up the internal nut 5, the conductor is clamped as already described. The cap nut 28 serves to secure the internal nut 5 in about the same manner as the locking nut 25 secures the nut 24 in the clamping device for the stretched conductor 3. This clamp is of well rounded external form, and the clamping parts act as a counterweight for the loose connecting section 3ª of conductor, to prevent the clamp from shifting out of the vertical position.

By a slight change in the construction, the tensioned cable 3 may be rotatably mounted in a terminal clamp of the type shown in Fig. 15. In the embodiment shown in Figs. 16, 17 and 18, the part 4ᵇ of the clamping head, its clamping device and cap nut 28 for supporting the untensioned connecting cable 3ª may be of the same construction as is illustrated in Fig. 15. The opposite end of the portion 4ᵇ carries or terminates in a shell 29 within which the head 4ᶜ is rotatably mounted. The clamping sleeve 1ª and the associated elements for retaining the end of cable 3 in the head 4ᶜ are of the same construction and are identified by the same reference numeral as the corresponding elements in Fig. 15. The shell 29 is threaded into a second shell 26ª which terminates in a lug having an opening 30 for receiving pin 32 to pivot the clamp upon the yoke 33 to which the insulating chains 10 are attached.

In other respects, this clamp is exactly the same as that shown in Fig. 15. This embodiment has the advantage that the firmly connected parts 29, 26ª, 28 and 4ᵇ—which represent, to some extent, the casing of the tension clamp—can be arranged in any desired position, and that they do not follow the twisting movements which may be set up in the hollow conductor in certain circumstances.

Both these last named embodiments of the tension clamp according to the invention may be of well rounded shape as shown more particularly in Figs. 16 and 17, and in arranging these clamps for double catenary suspension, the members connecting the clamp proper with the insulating chains may be rounded in the same manner. In order to prevent electrical losses by radiation, the arms (preferably steel castings) of the bow 33 are of elliptical tubular section 34 towards the centre and may be modified into circular cross-section towards the ends.

Figure 21:
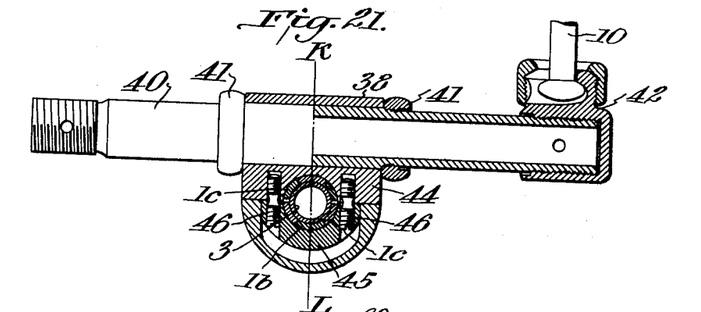
Fig. 21 the carrier clamp, partly as a section at right angles to the axis of the conductor, and partly as a corresponding elevation.
Figure 22:
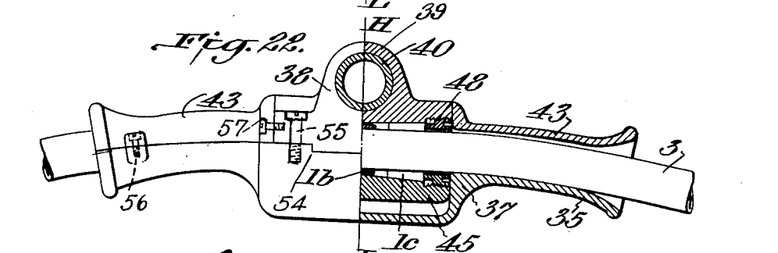
Fig. 22 is the corresponding vertical section and elevation parallel to the direction of the conductor.
Figures 23, 24:
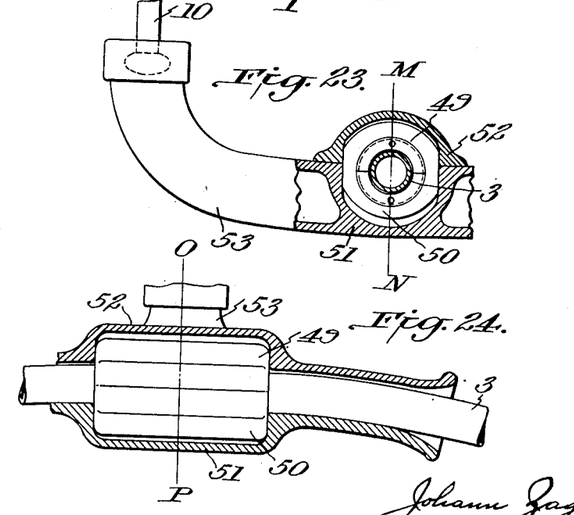
Figs. 23 and 24 are corresponding sections through a modified form of carrier clamp.

When the clamping sleeves according to the invention are used in carrier clamps, Figs. 21, 22, 23, extensions 35 and 36 are provided upon the lower part 37 of the carrier clamp casing to support the hollow conductor 3 at each side of the clamp.

The extensions are shaped, in the longitudinal axis, in conformity with the sag of the conductor, and their cross-sectional dimensions are the same as those of the conductor, so that the latter may be protected against deformation. The upper part 38 of the casing interlocks with the lower section 37, indicated at 54, and is secured thereto by screws 55. The part 38 is rotatably suspended by means of an attached eye 39, on a tubular pin 40 (e. g. of galvanized steel tube), and is prevented from shifting by means of an adjusting ring 41 or the like. The carrier chains 10 engage, in a suitable manner, in caps 42 mounted on both ends of the tube by means of threads or the like. In order to obtain a rounded shape on all sides, the extensions 35 and 36 of the lower part 37 of the casing are closed at the top by the covers 43 which are held in place by bolts 56, 57.

The clamping device consists of two pairs of clamping sleeves 1ᵇ and 1ᶜ, which are divided in the horizontal direction, arranged symmetrically in relation to the median plane H—J, and provided with oppositely directed slits 2. These sleeves are guided, in respect of one moiety, in the upper member 44 of the clamping head, mounted on an integral with the upper member 38 of the casing; and in respect of the other moiety, in the lower member 45 of the clamping head attached to the upper member by screws 46. The sleeves 1ᵇ and 1ᶜ are provided with recesses 47ᵇ and 47ᶜ so that they can, so far as is needed, slide into one another in order that the strain on the connecting screws 46 may be as nearly axial as possible. As already mentioned, the oppositely directed slits enable a concentric grip to be obtained all along the clamped surface. Two divided internal nuts 48 enable the conductor to be gripped with suitable preliminary clamping force. By suitably calculating the dimensions of the screws 46, these will collapse when a unilateral pull on the part of the conductor sets up a certain tension strain on one or other of the clamping sleeves 1$^b$ or 1$^c$. When this occurs, the member 45 drops down into the lower part 37 of the casing, the clamping device is freed and the conductor can slip freely through the carrier clamp until the tension in the adjacent sections of the conductor is equalized. The broken grub screws 46 must, of course be replaced by new ones when the conductor is put in order.

Another embodiment of the tension clamp with reference to the clamping device and the transmission of the load to the carrier chains, is shown in Figs. 23 and 24. The guiding of the clamping sleeves 1$^b$ and 1$^c$ is transferred from the upper member 38 of the casing (Fig. 22) and is combined with the lower guiding member 45 to form a separate clamping head 49—50. The lower member 51 of the casing (Figs. 23 and 24, corresponding to 37 in Figs. 21 and 22) in which the conductor and clamping head are housed, may also be used to transmit the load to the carrier chains by means of integral arms 53. The upper casing member 52 now serves exclusively to impart a rounded shape all over. The members 49 and 50 of the clamping head are, of course, also held together by means of suitably sized grub screws or similar safety devices, which will break when a definite maximum tension stress is exceeded.

The carrier clamps according to the invention can, of course, be shaped in such a way that they can be suspended on a single carrier chain, in place of the two shown in the drawing; and they may be used for either hollow or solid conductors in the same way.

I claim:—

1. A stretching clamp for a cable comprising a housing provided with means in axial alinement with the stressed cable for pivotally connecting the housing to a support, and a seat in said housing having means cooperating therewith for clamping a cable, the axis of said seat intersecting the axis of the stressed cable at an angle.

2. A stretching clamp comprising a housing providing a plurality of passageways receiving the ends of hollow conductors, the axes of said passageways being inclined to and intersecting each other, means in alinement with one of said passageways for pivotally connecting said housing to a support, and clamping means in each of said passageways for securing the end of a hollow conductor to said housing.

3. The invention as set forth in claim 2, wherein one of said passageways is an outwardly flaring conical bore, and the clamping means cooperating therewith comprises a cylindrical plug adapted to be snugly received within the end of the hollow conductor, a contractile sleeve having an outer conical surface conforming to the surface of said conical bore and an inner cylindrical surface for engagement with the conductor end, and a nut threaded on said housing and bearing against said sleeve.

4. The invention as set forth in claim 2, wherein the said passageway in alinement with said connecting means is substantially cylindrical, and the clamping means cooperating therewith comprises a contractile clamping sleeve adapted to be received within the end of the conductor, said sleeve having a conical inner surface, a cone within said sleeve, and a nut carried by said cone and bearing against said sleeve.

5. The invention as set forth in claim 2, wherein the said clamping means cooperating with the passageway which is in alinement with said supporting means comprises a clamping head rotatably supported in the said passageway and having a cylindrical bore for receiving the conductor end, a clamping sleeve having an inner conical surface and adapted to be positioned within the end of the conductor, a conical element within said sleeve, and means for effecting relative longitudinal movement of said sleeve and conical member to expand said conical member.

In testimony whereof I affix my signature.

JOHANN ZAGORSKI.